May 6, 1952     A. M. CHAMBERS, JR     2,595,926
SEALING DEVICE
Filed March 29, 1950
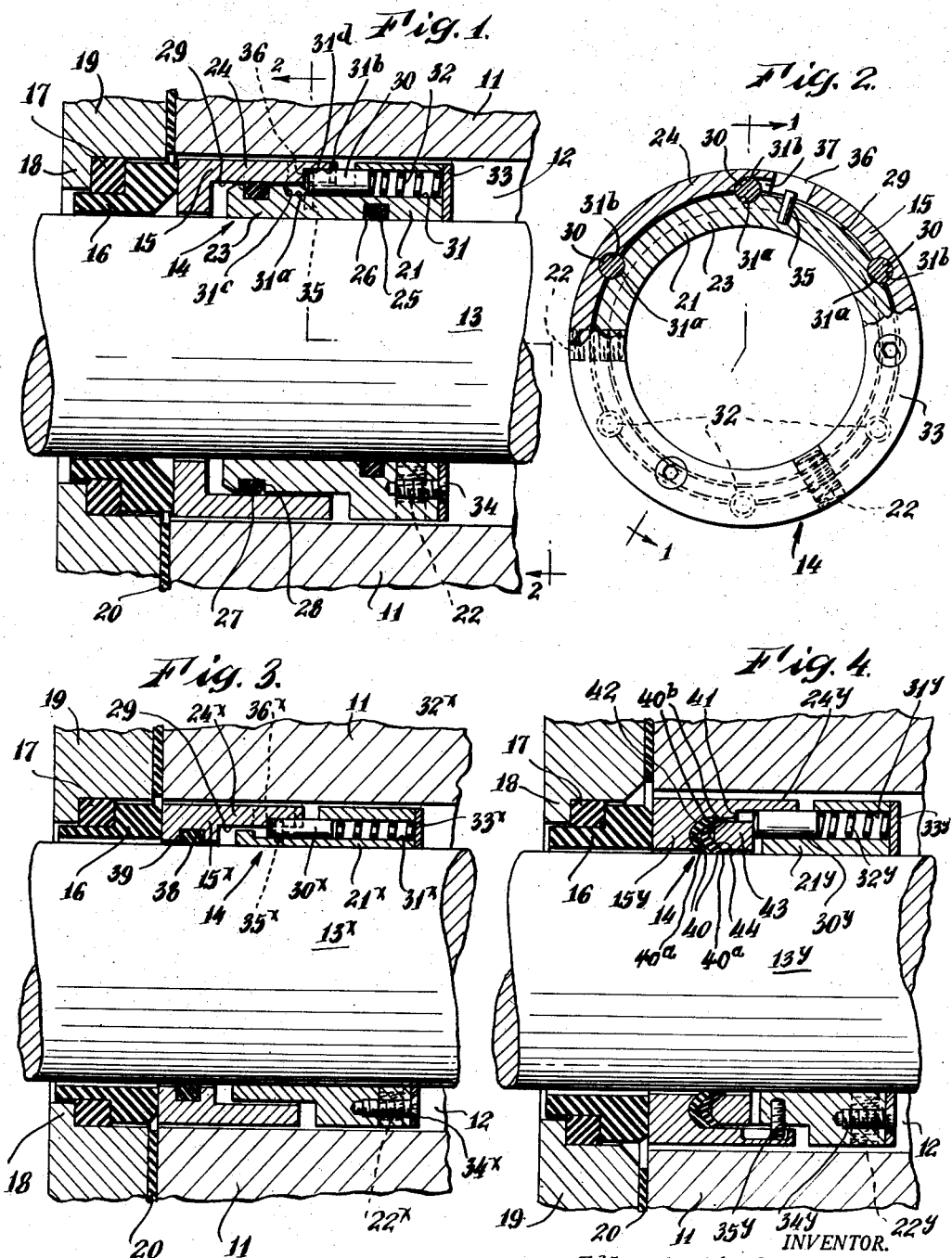
INVENTOR.
Albert M. Chambers, Jr.
BY
Fraser, Myers & Manley
ATTORNEYS.

Patented May 6, 1952

2,595,926

UNITED STATES PATENT OFFICE 2,595,926

SEALING DEVICE

Albert M. Chambers, Jr., Palmyra, N. Y., assignor to The Garlock Packing Company, Palmyra, N. Y., a corporation of New York Application March 29, 1950, Serial No. 152,567

8 Claims. (Cl. 286—11.15)

The present invention relates to sealing devices for effecting a seal between two relatively rotatable machine elements such as, for example, a machine casing and a rotatable shaft extending into an opening in said casing. More particularly, the invention is concerned with improved means for associating a sealing ring with one of such machine elements to render it non-rotatable relatively thereto and to bias the sealing ring for yieldable running seal engagement with a sealing surface associated with the other of the machine elements. For convenience, certain means for rendering the sealing ring non-rotatable relatively to its associated machine element, are referred to in the following specification and claims in various ways as "driving" means, members, rings, or pins, etc., irrespective of whether such means, members, rings or pins, etc. are directly associated with a rotatable or a stationary machine element.

An important object of this invention is the provision of improved driving means for positively driving a sealing ring, in a sealing device, so that packings which serve to seal the ring with respect to the machine element with which it is directly associated, may not be subjected to any torque which might cause excessive wear or otherwise damage such packings.

Another important object of this invention is the provision of improved means associated with one machine element for urging such a sealing ring axially into and maintaining it in effective running sealing engagement with a sealing surface associated with the other machine element.

Another important object of this invention is the provision of improved means which operatively complement each other in yielding the hereinbefore stated objects of driving the sealing ring and of thus urging and maintaining it in effective running sealing operation.

Another important object of this invention is the provision of an improved sealing device in which the parts thereof may be readily and inexpensively assembled into a unitary structure.

The foregoing and other objects are accomplished by the present invention of which several embodiments are shown in the accompanying drawing for illustrative purposes without limiting the invention to those particular embodiments.

In the drawing:

Figure 1 is a central axial section of a preferred embodiment of this invention, substantially on the angular lines 1—1 of Fig. 2.

Fig. 2 is a transverse section of the sealing device shown in Fig. 1, substantially on the irregular line 2—2 of that figure, and Figs. 3 and 4 are views of the general character of Fig. 1, but illustrating two further embodiments of this invention.

Referring to Figs. 1 and 2, a fragmentary portion of a machine casing 11 is shown with a cylindrical opening 12 formed therein through which extends a rotatable shaft 13. For the purpose of preventing leakage of fluid, sometimes under pressure, in a leftwardly direction between the shaft and the casing, there is provided a sealing device 14, according to this invention, which is generally cylindrical in shape and extends about the shaft with a wear ring or sealing ring 15 of said device yieldably pressing against and effecting a running seal with a sealing ring 16 which is non-rotatably, cushionedly mounted within a vibration ring 17, preferably of relatively soft, rubber-like material, held in place by a radial flange 18 of a plate or cap 19 suitably fixed to the casing 11 with a gasket or gasket material 20 interposed between and sealing the two.

In addition to the sealing ring 15, the sealing device includes a driving ring 21 which is fixed to the shaft 13 by one or more set screws 22 and has an integral sleeve portion 23 in telescoping relation to an integral sleeve portion 24 of the sealing ring 15. The portion 23 is shown in the several figures of the drawing as telescoping within the portion 24 but, obviously, within the invention, the portion 24 could telescope within the portion 23.

A suitable annular packing or gasket 25 is disposed within an interior annular groove 26 in the driving ring to provide a seal against fluid leakage axially, between the driving ring and the shaft. Means are also provided to seal against leakage of fluid between the driving ring 21 and the sealing ring 15. However, as the rings 15 and 21 should preferably be axially shiftable relatively to each other to enable the two sealing rings to stay in sealing contact even in the presence of end play in the shaft, the packing in this instance may advantageously, although not necessarily, be in the form of a packing ring 27 of relatively soft, flexible rubber or other suitable rubber-like material and of circular shape in cross section. The ring 27, commonly referred to as an O ring, may be seated within an annular groove 28 formed on the outside of the sleeve portion 23 of the driving ring. The O ring should be of such sectional diameter as to be compressed radially between the bottom of the groove 28 and the opposed inner cylindrical surface 29 of the sleeve portion 24 of the sealing ring 15 in order to effect a good seal therebetween. This radial compression of the O ring enlarges it in axial dimension, and the groove 28, preferably, should be somewhat wider than the enlarged axial dimension of the O ring so that the latter may shift or roll within said groove in the presence of axial shifting of the sealing ring 15 relatively to the driving ring 21.

The driving means or, i. e., the means by which the rings 15 and 21 are restrained against relative rotation, preferably consist of a plurality of driving pins 30 disposed, with a close sliding fit, within a circumferential series of axial bores 31 formed in the main portion of the driving ring 21, extending in full section from the right end of the latter, as viewed in Fig. 1, and, in half section, into the sleeve portion 23 of the driving ring as at 31a. The bore, in half section also extends into the sleeve portion 24 as at 31b so that, between the two sleeve portions 23, 24, the full circular cross section of the bore is completely defined. The bores 31 may be conveniently and economically drilled by placing the rings 15 and 21 within a suitable jig arranged to hold them in such partially telescoped relative positions that a drill, entering the driving ring from the right end, as viewed in Fig. 1, will bottom at the bottom, bore portions identified as 31c and 31d in that figure. It will readily be understood, particularly upon consideration of Fig. 2, that with the driving pins 30 extending into both bore portions 31a and 31b, the sealing ring 15 is positively constrained to rotate with the driving ring, or i. e., the two said rings are positively restrained against any material rotation relatively to each other.

Plural coil springs 32 are disposed in the several bores 31 and are held therein in axially compressed condition between the adjacent ends of the pins 30 and an annular closure plate 33 which is firmly secured upon the end of the driving ring 21 by countersink screws 34 extending through suitable countersunk screw holes in said plate and threaded into suitably tapped holes in the driving ring.

The sealing device 14, in use, should be locked by the set screws 22, in such position on the shaft 13 that the several parts of the device will be approximately in their relative positions shown in Fig. 1. As there shown, the sleeve portion 23 is not quite fully telescoped into the sleeve portion 24 and the bottom, bore portion 31c is clear of the near end of the pin 30. In this relationship of the parts, the expansive force of the spring 32 acts through the pin 30, pushing on bottom, bore portion 31d to urge the sealing ring 15 yieldably into its running sealing engagement with sealing ring 16, and to maintain the two said sealing rings continuously in such sealing engagement even in the presence of limited relative endwise shifting of the shaft within the machine casing 11.

As it is highly desirable to constitute the sealing device 14 as a unitary structure, the rings 15 and 21, and consequently, the other parts of the device are held against disassociation by a radially extending lock-pin 35 which may be embedded or otherwise fixed into the sleeve portion 23 and extend radially outwardly into a recess or slot 36 formed in the sleeve portion 24. The recess 36 is of such axial dimension as to permit relative axial movement of the rings 15 and 21 only approximately to the extent necessary to enable the device to compensate for any axial shifting of the shaft in the machine casing. In any event the axial limits of the recess 36 are such as to prevent unintentional disassociation of the parts of the device.

In assembling the parts of the device, the O ring 27 is first stretched over the end of the sleeve portion 23 and seated within the groove 28. Then, with the lock-pin 35 in alignment with the particular bore portion 31b, which is adjacent to the recess 36, this being the top bore portion shown in Fig. 2, the driving ring 21 is pressed axially to telescope it completely into the ring 15, then by clockwisely rotating the ring 21, as viewed in Fig. 2, the protruding end of the lock pin is caused to pass within a short inner, circumferentially extending recess 37 formed in the sleeve portion 24 to bring that pin into the recess 36.

The mentioned rotation of the ring 21 brings the opposed bore portions 31a and 31b of the several bores into radial alignment so that the driving pins 30 may then be pushed or dropped into the bores, followed by the several springs 32, after which the closure plate 33 may be applied and held in place by the screws 34. As the driving pins 30 prevent relative rotation of the rings 15 and 21, the lock pin is limited to axial movement within the recess 36, and as the latter is closed at its axial ends, the device is held together as a complete sealing unit and the relative axial movement between the parts thereof is limited as already described. The packing 25 may be placed within the groove 26 either when the device is assembled or when it is installed as preferred.

The embodiment illustrated in Fig. 3 differs generally from that illustrated in Figs. 1 and 2 in that it is considerably more compact and smaller in radial section. More specifically it has no packing between its driving ring 21x and the shaft 13x and has no sealing or packing ring between its sealing ring 15x and the driving ring 21x. Instead of these two packing or sealing provisions, the embodiment of Fig. 3 includes an O ring 38 disposed within an inner annular groove 39 formed in the sealing ring 15x. This groove and O ring should be relatively proportioned and compressed similarly to hereinbefore described O ring 27 and the latter's groove 28, to effect a seal between the shaft 13x and the sealing ring 15x and to permit axial shifting of the latter relatively to the driving ring 21x. This embodiment also includes driving pins 30x, springs 32x and lock-pin 35x which are substantially similar or equivalent in design and operation to corresponding parts in the embodiment of Figs. 1 and 2.

The embodiment illustrated in Fig. 4 differs from the embodiment of Fig. 3 only in some differences in the proportions of its parts and in employing packing rings 40 of relatively soft packing material of V shape in cross section instead of and for the same purpose as the O ring 38 of Fig. 3. Two rings 40 are shown in the drawing, one nested within the other in an annular recess 41 formed in the sealing ring 15y.

The V rings 40, as a pair, are seated, with the latter's convex end within a generally V-shaped, axially facing groove 42 defining a side of the recess 41. A follower or adapter ring 43 has a frusto-conical portion 44 at one end which presses into the concave side of the pair of rings 40 and the pressure of the adapter ring against the said pair of rings is yieldably maintained by the compression springs 32y, the force of which is communicated to the adapter ring through the driving pins 30y.

The adapter ring 43 tends to flatten the V rings 40 and thus enhance their sealing effect with the cylindrical surface defining the recess 41 and with the surface of the shaft 13y. Also, as the device is preferably installed with the contained pressure at the device's right end (as viewed in the drawing) and tending to escape leftwardly along the shaft, such pressure, itself, enhances the sealing effect of the V rings 40 by urging the latter's inner and outer lips 40a and 40b into firm sealing engagement with the adjacent cylindrical surfaces of the sealing ring 15y and the shaft 13y. The described V ring packing arrangement may employ more than two or only one V ring, as desired, the practicability of such alternative arrangements depending upon the particular requirements of the machine in which the seal is used.

In all the illustrated embodiments, the driving ring 21, 21x or 21y turns with the shaft to which it is locked by the set screws 22 and the driving ring drives the sealing ring 15, 15x or 15y through the driving pins 30, 30x or 30y. It should be obvious that, within this invention, the several parts of the illustrated or equivalent devices could be designed and positioned reversely in a radial direction with the equivalent of the driving ring fixed against rotation within an opening in the machine casing and with the equivalent of the driving pins holding a sealing ring of the device against rotation. In such an arrangement, a sealing ring equivalent to the ring 16 (Fig. 1) would be fixedly associated with and rotate with the shaft.

Although certain variations of this invention have hereinbefore been suggested, no effort has been made to suggest all possible variations. On the contrary, it will readily be understood that the present inventive concepts may be embodied in various other arrangements without departing from the invention.

What I claim is:

1. A sealing device effecting a seal between two relatively rotatable machine elements, comprising a driving ring adapted for non-rotatable association with one of said machine elements; a sealing ring having a radial sealing surface adapted to effect a running seal with a sealing surface associated with the other of said machine elements; driving means for restraining the two rings against relative rotation comprising intertelescoping sleeve portions of the two rings, having at least one axially extending bore formed in intimately opposed cylindrical surfaces of telescoping portions of said rings and a rigid driving member in said bore in sliding relationship with at least one of the said sleeve portions and interlocking the two rings against relative rotation; and means for urging the sealing ring toward the facing direction of its mentioned sealing surface, the latter means comprising spring means coacting with the driving ring and with said driving member to urge the latter against one end of the said bore portion of the sealing ring and thereby urge the latter yieldably in the stated facing direction; the end of the bore portion of the driving ring which corresponds with said one end of the sealing ring's bore portion being closer than said one end of the sealing ring's bore portion to the sealing ring's said sealing surface.

2. A sealing device for effecting a seal between two relatively rotatable machine elements, comprising a driving ring adapted for non-rotatable association with one of said machine elements; a sealing ring shiftable axially relatively to the driving ring and having a radial sealing surface adapted to effect a running seal with a radially extending, annular sealing surface associated with the other of said machine elements; driving means for restraining the two rings against relative rotation comprising intertelescoping sleeve portions of the two rings having at least one axially extending bore formed in intimately opposed cylindrical surfaces of telescoping portions of said rings and a rigid driving member in said bore in sliding relationship with at least one of said sleeve portions and interlocking the two rings against relative rotation; the sealing ring having a radially extending abutment surface associated therewith in axial alignment with said driving member; the said device, further, including spring means coacting with the driving ring and with the driving member to urge the latter into engagement with said abutment surface, and, thereby to urge the sealing ring yieldably into running sealing engagement with the sealing surface of the said other machine element.

3. A sealing device according to claim 2, the sealing ring being formed with an annular packing space opening at one end toward the driving ring, the device further including one or more packing rings of V-shape in radial cross-section disposed within said space in sealing engagement with the walls thereof and with an adjacent surface of one of the machine elements, and further including an adapter ring disposed between the packing ring or rings and the driving member and having a portion constituting the mentioned abutment surface; the adapter ring being yieldably urged, by the spring means, through the driving member, against the packing ring or rings, to compress the latter axially and urge the sealing ring into its mentioned sealing engagement with the sealing surface of said other machine element.

4. A sealing device according to claim 2, the driving member comprising a cylindrical pin, and the said spring means comprising a coil spring disposed in axial alignment with said pin, and coacting at one end with the end of the driving pin remote from the abutment surface associated with the sealing ring and, at its other end, with an abutment surface associated with the driving ring.

5. A sealing device according to claim 4, the bore having one end thereof opening at the end of the driving ring which is remote from the sealing ring, the coil spring being disposed within said bore, and the device further including an annular closure plate fixed to the driving ring and closing said one end of the bore.

6. A sealing device for effecting a seal between two relatively rotatable machine elements, comprising a driving ring adapted for non-rotatable association with one of said machine elements, a sealing ring adapted to effect a running seal with a sealing surface associated with the other of said machine elements, and driving means restraining the two rings against relative rotation; the driving means comprising intertelescoping sleeve portions of the two rings, having at least one axially extending bore formed in intimately opposed cylindrical surfaces of telescoping portions of said rings and a driving member in said bore in sliding relationship with at least one of the said sleeve portions and interlocking the two rings against relative rotation; one of said sleeve portions having a recess formed therein and the other sleeve portion having a detent extending into said recess for limiting relative axial movement of the two rings; the device, further, including a second recess extending circumferentially in said one sleeve portion from the first-mentioned recess to the part of said bore which is formed in said one sleeve portion; the detent being movable axially within said first recess and said bore part and circumferentially within said second recess when the two rings are correspondingly moved relatively to each other in assembling and disassembling the device.

7. A sealing device for effecting a seal between a rotatable shaft and an opening in a machine casing through which the shaft extends, comprising a driving sleeve having means for fixing it upon a shaft against rotation relatively thereto, a sealing sleeve in sliding intertelescoping relationship to the driving sleeve and having a radial sealing surface adapted to effect a running seal with a radial sealing surface associated non-rotatively with the machine casing, means for yieldably urging said sealing sleeve, axially of the driving sleeve, in the direction toward which the sealing sleeve's said sealing surface faces and for preventing relative angular movement of the two sleeves; the said sleeves being formed with one or more axially extending recesses, the opposite sides of which are defined by opposed, axially extending grooves formed in intimately opposed, cylindrical surfaces of said sleeves, the inner ends of said grooves in the sealing sleeve being more remote from the sealing sleeve's said sealing surface than the corresponding ends of the said grooves in the driving sleeve, and the last-mentioned means comprising a solid, relatively non-resilient driving member slidably disposed in each of said recess or recesses and extending into each of such opposed grooves thereof for preventing material relative rotation of the two sleeves and spring means coacting with the driving sleeve and with said driving member or members to urge the latter against the inner ends of said grooves in the sealing sleeve and thereby urge the latter yieldably in the facing direction of its said radial sealing surface.

8. A sealing device according to claim 7, the said driving member being slidable axially relatively to the driving sleeve and in abutting engagement, at its one end, with the sealing sleeve; and the said urging and angular movement preventing means including a separate spring, in each of said recess or recesses, coacting with the driving sleeve and with the opposite end of the driving member to urge the latter and the sealing sleeve axially in the direction toward which the sealing sleeve's said sealing surface faces.

ALBERT M. CHAMBERS, Jr.

REFERENCES CITED

The following references are of record in the file of this patent:

UNITED STATES PATENTS

| Number | Name | Date |
| --- | --- | --- |
| 1,470,621 | Jackson | Oct. 16, 1923 |
| 2,222,779 | McHugh | Nov. 26, 1940 |
| 2,297,302 | Hornschuch | Sept. 29, 1942 |
| 2,383,862 | Hornschuch | Aug. 28, 1945 |
| 2,424,690 | Hamilton | July 29, 1947 |
| 2,434,458 | Curry | Jan. 13, 1948 |
| 2,479,711 | Arutunoff | Aug. 23, 1949 |